Jan. 18, 1944.　　　　J. E. HARMOND　　　　2,339,394
BALER
Filed June 30, 1943　　　2 Sheets-Sheet 1

INVENTOR
J. E. HARMOND
BY
ATTORNEYS

Jan. 18, 1944.  J. E. HARMOND  2,339,394
BALER
Filed June 30, 1943   2 Sheets-Sheet 2

INVENTOR
J. E. HARMOND
BY
ATTORNEYS

Patented Jan. 18, 1944

2,339,394

UNITED STATES PATENT OFFICE 2,339,394

BALER

Jesse Edward Harmond, Leland, Miss., assignor to Claude R. Wickard, as Secretary of Agriculture of the United States of America, and his successors in office Application June 30, 1943, Serial No. 492,826

2 Claims. (Cl. 100—19)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to a device for baling fibrous materials, particularly cotton, and has among its objects the improvement of certain features of such devices, as will be more fully set forth in the following description, claims, and annexed drawings, in which Figure 1 is a plan view of a baler having two press boxes;

Figure 1:
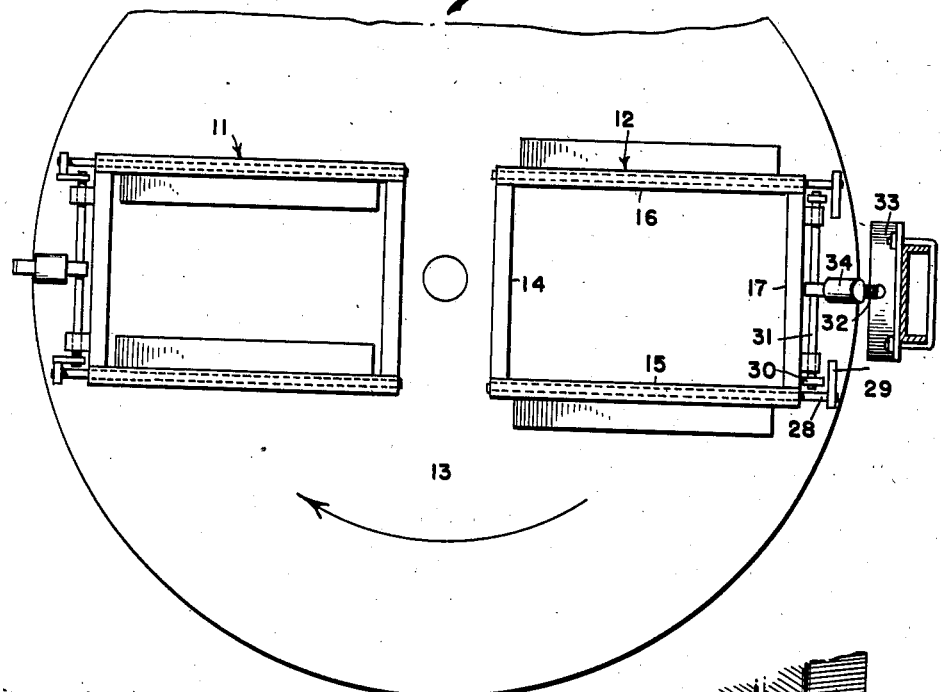
Figure 2:
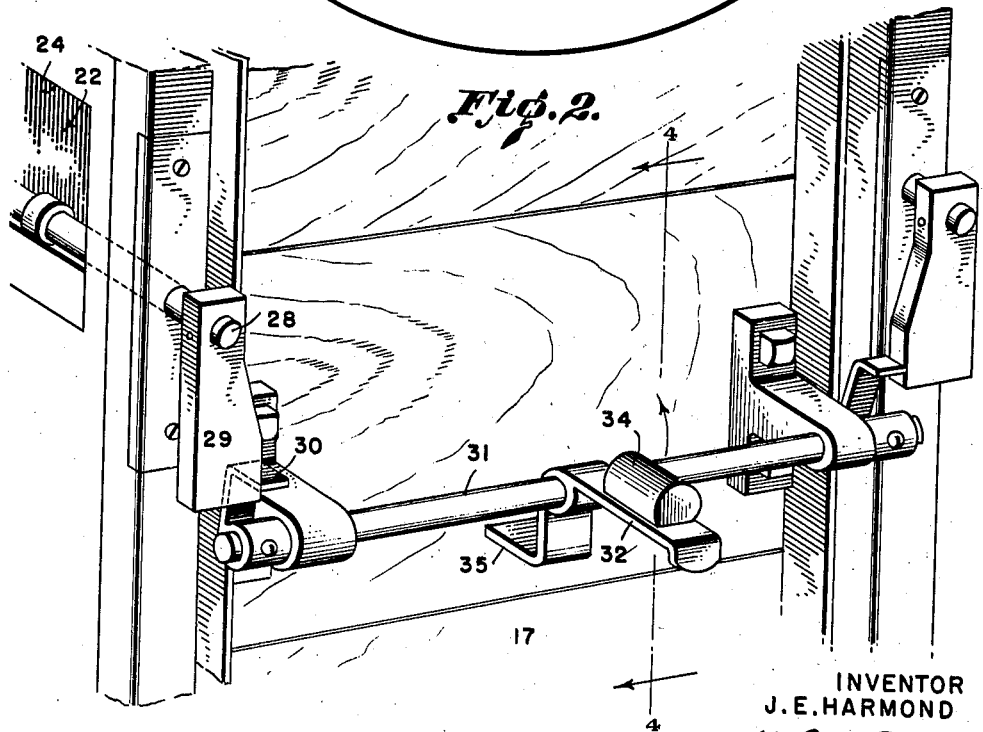
Figure 2 is a three-dimensional fragmentary view of a part thereof.

Referring to the drawings in detail, press boxes 11 and 12 are secured on a turn table 13. The press boxes are similar, and only one of them will be described in detail. Press box 12 is provided with a rear wall 14, side walls 15 and 16, a front wall 17, and is open at the top. The side walls are held together at their upper ends with a chain 18 on one end of which is a loop 19 mounted on a cam 20 which may be rotated by lever 21 to release the tension on the chain. This permits the sides to move away from each other sufficiently to release a bale of cotton for removal from the press box.

The cotton to be baled is loaded in charges into the press box centrally through the open top, and is pressed downwardly with a plunger (not shown). As the plunger recedes, preparatory to loading of another charge, it is necessary to have means to prevent rebound of that portion of the cotton already compressed in the box. Such means is provided by similar press dogs 22 and 23. For a detailed description pertaining to both, reference is made to press dog 22, which is of triangular, prismatic shape with continuous sides. Wall 15 is provided with a rectangular-shaped opening 24, near the open end of the press box and of length substantially equal to the width of the wall 15. The press dog is of length corresponding substantially to the length of the opening, and is mounted to rotate on an axis near a corner of the press dog and adjacent the lower edge of the opening. In the charging position, as shown in full lines in Figure 3, the side 25 of the press dog faces toward the bottom of the box. The charges of cotton when loaded into the box slide down between the inclined surfaces 26 and 27 of the press dogs and spread out under them. When the plunger recedes, the compressed cotton rebounds against the downwardly facing sides, and is held compressed in this position.

Figure 3:
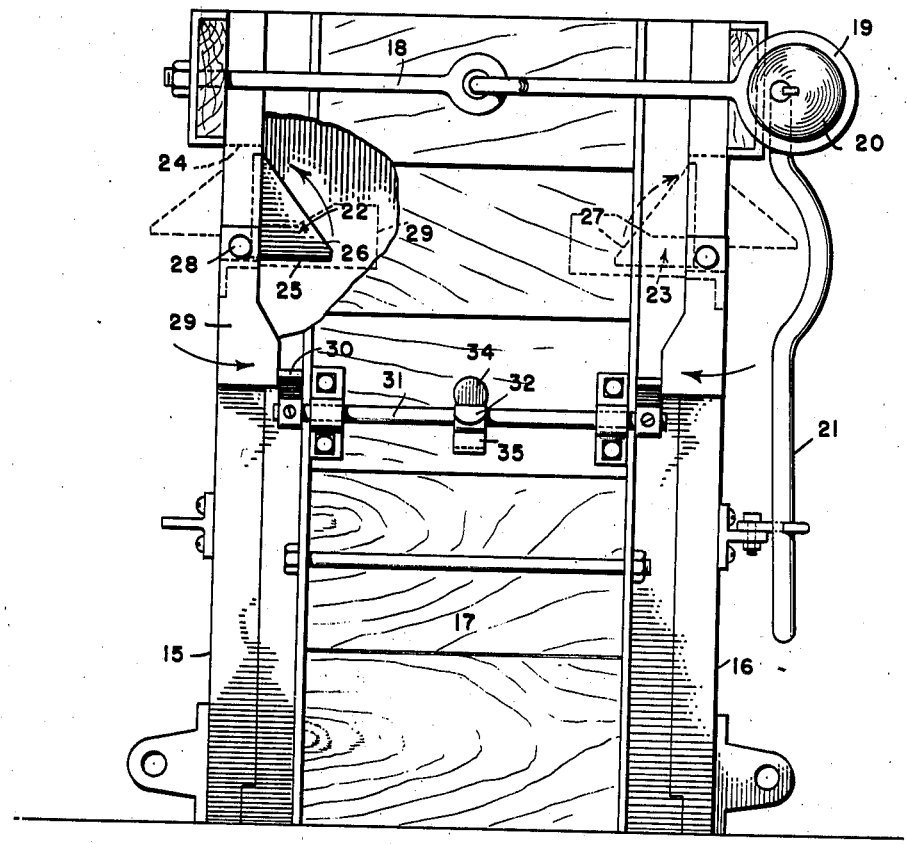
Figure 3 is an end elevation of a press box of the baler with part broken away.
Figure 4:
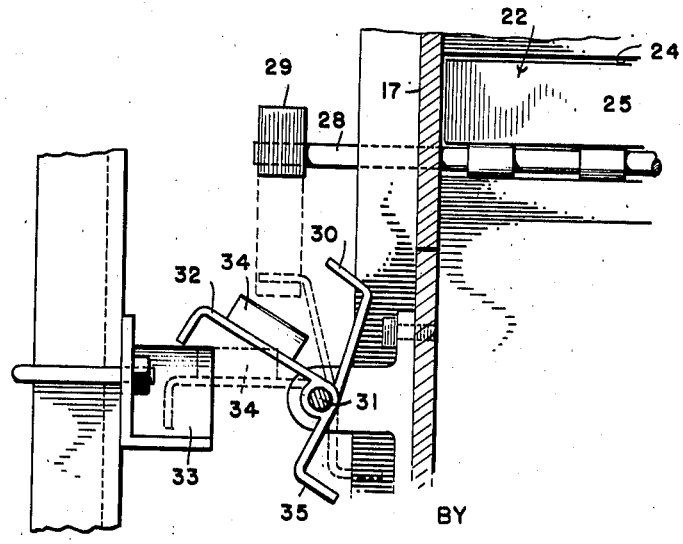
Figure 4 is a sectional view of a part of the device on line 4—4 of Figure 2, the dotted line position of some parts corresponding to that of Figure 2 and the full line position to that of press box 12 of Figure 1.

In order that the press dog may be released to remove a completed bale, it is secured to a rotatably mounted shaft 28, which permits it to be rotated through the opening 24 to assume the dotted line position shown in Figure 3, the side facing downwardly thereby assuming a position co-planar with the wall of the press box. The projecting end of the shaft 28 at the front side of the press box is provided with a weight 29 secured thereon normally to swing the press dog to the charging position. A latch 30 secured to a rotatable shaft 31 prevents swinging of the weight 29, thereby holding the press dog in the charging position.

With the turn table positioned as shown in Figure 1, the press dogs are in charging position relative to press box 11, which is then loaded with cotton. When the bale is tied, the turn table is rotated until press box 11 assumes the position of press box 12. In this position a lever 32 fixed to shaft 31 rides over a cam 33 suitably supported near the turn table, thus causing rotation of shaft 31 and consequent movement of latch 30 to release weight 29. The press dogs then swing to the uncharging position due to the resiliency of the compressed cotton for the pressing out of the bale. An extension 35 of lever 32 abuts the front wall of the press box when the lever drops thus to prevent undue movement of the latch.

After removal of the bale, the weights swing the press dogs back to the charging position. As the turn table is rotated, lever 32 rides off cam 33, and a weight 34 attached to the lever causes it to drop, thereby moving latch 30 back to its holding position, and the empty press box is ready to receive another load.

The press dogs, due to their shape, present continuous downwardly facing surfaces against which the cotton presses in its rebound, and continuous inclined surfaces over which the cotton slides when loaded into the press box. Due to this structure, the press dogs do not collect cotton fiber. This gives a uniform pressure on the edge of the bale, with consequent improvement in uniformity of density of the bale and ease of operation of the baler. It will thus be seen that each incoming charge of fibrous material is centrally introduced into the top of the press box, and this results in a uniform distribution which is a prerequisite for uniform packaging.

Having thus described the invention, what is claimed is:

1. In a baler, an open-topped press box having opposite walls, a triangular prismatic-shaped press dog having continuous sides mounted adjacent each of two opposite walls in such manner that in the charging position a side of the press dog faces toward the bottom of the box and another side provides a surface inclined toward the bottom, means for holding the press dogs in the charging position, whereby material to be baled, when loaded through the open top, will slide past the inclined surfaces and be held compressed between the bottom of the press box and the sides of the press dogs facing toward the bottom, and means for releasing the press dogs, whereby they will rotate and release the compressed material.

2. In a baler, an open topped press box having opposite side walls each of which has a rectangular-shaped opening of length substantially equal to the width of the wall, a triangular prismatic-shaped press dog for each side wall having continuous sides and of length corresponding substantially to that of the opening and mounted to rotate on an axis near a corner of the press dog and adjacent the edge of the opening nearest the bottom of the press box in such manner that in the charging position a side of the press dog faces toward the bottom of the press box and another side provides a surface inclined toward the bottom, means for holding the press dogs in the charging position, whereby material to be baled when loaded through the open top will slide past the inclined surfaces and be held compressed between the bottom of the press box and the sides of the press dogs facing toward the bottom, and means for releasing the press dogs, whereby they will rotate into the openings and the sides facing toward the bottom of the press box will assume positions co-planar with the side walls, thereby to release the compressed material.

JESSE EDWARD HAMMOND.